March 17, 1964 H. C. RESSLER ETAL 3,125,633

COMMUNICATIONS RECORDING SYSTEM

Original Filed Feb. 20, 1958 6 Sheets-Sheet 1

INVENTORS
HUGH C. RESSLER
JOHN W. SMITH
GEORGE M. STAMPS
BY J. B. Burke
ATTORNEY March 17, 1964 H. C. RESSLER ET AL 3,125,633

COMMUNICATIONS RECORDING SYSTEM

Original Filed Feb. 20, 1958 6 Sheets-Sheet 2

INVENTORS
HUGH C. RESSLER
JOHN W. SMITH
GEORGE M. STAMPS

BY J. B. Burke
ATTORNEY

*INVENTORS*
HUGH C. RESSLER
JOHN W. SMITH
GEORGE M. STAMPS
BY J. B. Burke
ATTORNEY

COMMUNICATIONS RECORDING SYSTEM

Original Filed Feb. 20, 1958

INVENTORS
HUGH C. RESSLER
JOHN W. SMITH
GEORGE M. STAMPS

BY J. B. Burke
ATTORNEY.

INVENTORS
HUGH C. RESSLER
JOHN W. SMITH
GEORGE M. STAMPS

BY J. B. Burke
ATTORNEY

COMMUNICATIONS RECORDING SYSTEM

Original Filed Feb. 20, 1958 6 Sheets-Sheet 6

INVENTOR.
HUGH C. RESSLER
JOHN W. SMITH
GEORGE M. STAMPS

BY J. B. Burke
ATTORNEY

United States Patent Office 3,125,633
Patented Mar. 17, 1964

3,125,633
COMMUNICATIONS RECORDING SYSTEM

Hugh C. Ressler, Bayside, and John W. Smith, Whitestone, N.Y., and George M. Stamps, Palos Verdes Estates, Calif., assignors, by mesne assignments, to Hogan Faximile Corporation, a corporation of Delaware Continuation of application Ser. No. 716,357, Feb. 20, 1958. This application Oct. 12, 1960, Ser. No. 62,297
8 Claims. (Cl. 178—6.6)

This invention relates to the art of communications systems and particularly concerns a system for transmitting and recording graphic information.

The invention is particularly applicable to facsimile communications wherein graphic copy is scanned at one location and is electrically transmitted to a receiving station where the copy is recorded.

The objects of the invention are to provide:

A communications or data handling system which has a high speed sequential data read-in and corresponding speed parallel data read-out capability.

A system in which graphic copy is scanned sequentially to produce successive pulses, the pulses being converted to produce parallel recorded marks on a recording medium advancing at high speed.

A system in which graphic copy is scanned sequentially to produce corresponding video signals, the video signals being sampled sequentially, stretched, and simultaneously recorded by parallel marking means.

A facsimile system in which copy is sequentially scanned to produce video signals, the signals being converted for simultaneous parallel marking by closely spaced multiple styli means on a moving copy medium.

A facsimile system of the character described, wherein the speed of scanning and recording may be at a rate ranging up to 200 or more inches of copy per second measured linearly in the path of advance of the copy.

A communications system in which read-in pulses are transmitted sequentially to a receiver, the pulses being successively stretched in time and then graphically recorded in parallel.

In prior systems used for transmitting and recording intelligence in the form of printed characters, pictures, and other graphic representations, it has been customary to employ intersecting or contacting electrical recording electrodes to define a single recording point or spot on a recording medium disposed between the electrodes. Usually the graphic copy is recorded line by line by means of a stationary linear electrode and rotating helical electrode with an electrolytically markable recording medium disposed between the electrodes. Systems using such recorders are severely limited in the maximum recording speeds attainable because of mechanical difficulties inherent in rotating an electrode at speeds of the order of 1000 or more revolutions per minute while maintaining contact with a rapidly advancing recording medium and a stationary electrode.

Multi-channel facsimile communications systems have been known heretofore wherein a plurality of scanning and recording elements have been used at the scanning and recording ends respectively of the communications system. The several signals generated by the scanning elements were channeled through filters which provided frequency selectivity to corresponding recording elements in the form of styli. Such prior systems required complicated scanner assemblies and a large number of different filters. A further objection to certain of such systems was their use of recording paper which was marked by transmission of electrical sparks through the paper. In those systems the use of closely packed recording styli was precluded because of fouling of the styli due to accumulation of carbon deposits and electrical shorting between adjacent styli due to the high voltages required for sparking.

A desirable feature of a multiple stylus recording system is the capability of recording at N times the recording speed of a single spot recording system where N is the number of stylus electrodes. This high speed capability results from the fact that each stylus in a multistylus recorder can be used to mark an element of one scanning line for a period of time equal to the duration of the scanning line, whereas in a single spot recording system the marking time available for recording an element of a line is only the time required to scan a single element along the scanning line. The ratio of these time intervals is approximately the total number of elements within one horizontal line of copy, or N.

According to a preferred form of the invention, the high speed capability of multi-stylus recording at a receiving station is accomplished in conjunction with a single spot scanner at a transmitter station, and the use of costly and complex multiple channel filters heretofore employed has been avoided. A converter is provided at the receiver which operates upon the sequential video signals generated by the single spot scanner to provide a multiplicity of stretched, parallel output signals suitable for use in a multi-stylus recording assembly. By sequentially scanning successive elements along each line of copy, stretching the video signals in time, and simultaneously recording all the scanned elements of each line in a parallel array, the marking currents required to produce legible, high definition copy are reduced to practical magnitudes.

According to the present invention a system is provided in which graphic copy recording speed has been increased to equal the copy feed velocity, thus permitting an increase of many fold in recording speed over conventional rectilinear stroke recording. The system embodying the invention preferably employs moist electrolytic recording paper which can be marked at high recording speeds by using moderate potential differences between the recording electrodes. Recording paper of this type has a low impedance characteristic which permits the use of closely spaced multiple recording styli assemblies. Styli disposed in an array of one hundred or more to the inch may be employed with 75 to 100 or more being particularly advantageous for high speed facsimile recording. The use of electrolytic marking paper of this type results in instantly visible graphic recordings.

Electrolytic recording paper requires only low voltages. Close spacing of the styli is not limited by interstylus sparking. Electric current flow is maintained by mechanical contact of the styli with the moist paper web. The styli electrodes may be arranged as flexible elements disposed in a closely spaced linear array intersecting a stationary linear electrode with the recording medium drawn between the styli and the linear electrode at high speed in a direction transverse to the linear array. A suitable recorder assembly of this type is disclosed in copending patent application 693,564 of George M. Stamps, filed October 31, 1957.

The invention will be explained with particular reference to a system having a one inch wide parallel data or copy read-out capability accomplished by means of one hundred styli spaced one-hundredth of an inch apart, measured between centers. The copy may of course be greater or less in width than one inch. The transverse arrangement of the multi-stylus recording elements may range from a fraction of an inch to several feet. The read-out capability of the system may be one or more inches of copy per second measured in the path of advance of the copy. The system employs a correspondingly high speed sequential copy or data read-in capability.

The basic components of the system are a transmitter and receiver. The transmitter includes an appropriate scanner or other device for producing video pulses sequentially, each representative of an element of a scanned graphic line or an element of some other form of data. The receiver station provides a means for sampling and converting the sequential pulses to stretched pulses having substantially equal time duration. In the receiver there is a video circuit for receiving video signals from the scanner. The video signals are accompanied by synchronizing pulses which are separated at the transmitter by a synchronizing pulse stripper circuit. The synchronizing pulses are used to actuate a pulse generator which serves as a source of timing pulses in the system. A sequential stepping circuit is provided to receive the timing pulses as well as the synchronizing pulses for generating and produce therefrom a sequence or burst of pulses. The burst of pulses represents the time or pulse division of one scanned line to be recorded. A pulse distributing circuit together with associated coupling circuits receives the burst of pulses and distributes them to a plurality of gate circuits which also receive the video pulses directly from the video circuit. The gate circuits act as coincidence circuits to actuate in turn each of a plurality of pulse stretcher circuits. The pulse stretcher circuits serve to delay or stretch in time each actuating pulse so that the outputs thereof all have substantially equal time durations. Connected to each pulse stretcher circuit is a marking amplifier which receives the stretched pulse, amplifies it and applies it to a marking element such as a stylus. Since the marking pulses are stretched to a time duration nearly equal to the duration of a scanning cycle, i.e. the scanning time for an entire line of copy, each stylus marks almost continuously in the direction of advance of the copy depending, of course, on whether or not the received signal calls for marking.

The theory of operation of the system means may be explained briefly as follows:

In single spot sequential scanning the scanning spot generally moves from left to right along a scanning line and views in succession the N elements of the subject copy forming this line. The resulting wave form generated by a scanning photocell has an amplitude varying with time. The amplitude of the wave at a preassigned instant of time $t_1$ will correspond to the amount of light received from some particular element along the scanning line, say the first element. If $t_0$ is the time required to scan one line, then if one examines the video wave form at a time $t_1+t_0$ later, the amplitude of the wave will then correspond to the signal then being received from the first element of the next line. The signal amplitude of the wave may have changed, since the subject copy has been advanced by one line. By examining or sampling the wave at regular intervals of time, namely $$t_1,\ t_1+t_0,\ t_1+2t_0\ .\ .\ .\ +kt_0$$

the resulting amplitude values always correspond to the light received from the first element of successive lines. Again if one samples the wave at an instant of time $t_2$, where $t_2$ is later than $t_1$ by an amount required to scan one element of copy, then the amplitude of the wave will correspond to the light received from the second element along the scanning line. By sampling the video wave form N times during the scanning of one line, the resulting samples correspond to the light values received from the N elements along the line and they can be assigned to the appropriate styli at the recorder. By repeating this sampling procedure at regular intervals of time equal to $t_0$, there is obtained a series of scanning line samples for reproducing two dimensional subject copy.

In a black and white system according to the present invention, the amplitude of the video wave has but two values which may be taken as 0 (white) or 1 (black).

The duration of one sample of the video wave cannot be greater than $1/N$ of the scanning line period, $t_0$, and consists of either a pulse of unit maximum amplitude or one of minimum amplitude. These narrow pulse samples cannot be directly applied to the recording styli. It is necessary to "hold" or "stretch" the individual samples for a period of time nearly equal to $t_0$, the scanning line period.

In addition to the sampling means, another important component provided in the converter is the pulse stretcher. This may be an active network which upon receipt of a short trigger pulse at its input terminals delivers a prolonged pulse of controllable duration at its output terminals. The length of this pulse controls the definition of the system in the direction of the paper feed. If the pulse is too short, inefficiency and lack of high speed recording results. If the pulse is too long, the recording will spill over into the next line with attendant loss of definition.

The invention will be best understood with reference to the following detailed description, taken together with the drawings, wherein.

Figure 7A:
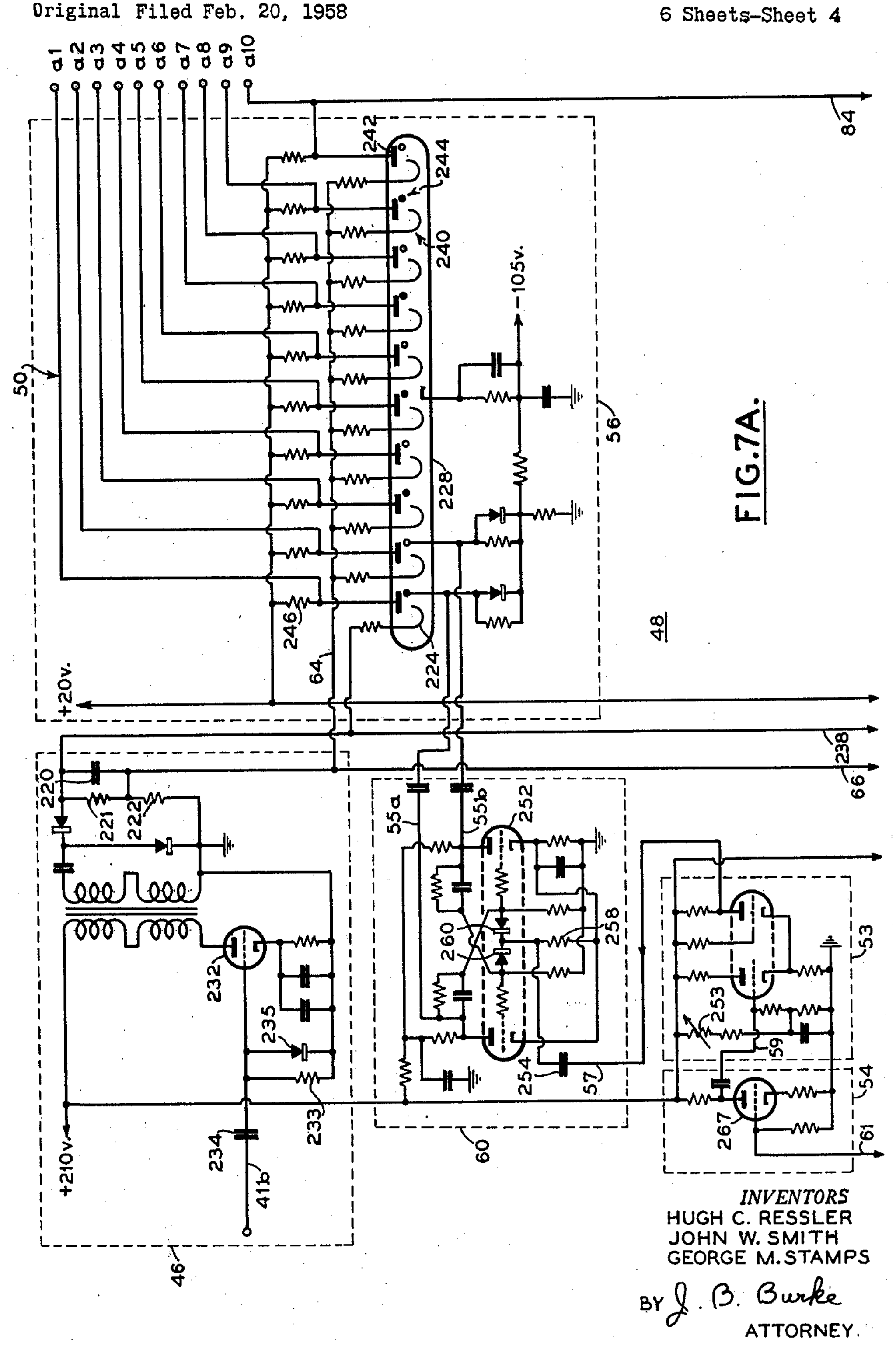
Figure 7B:
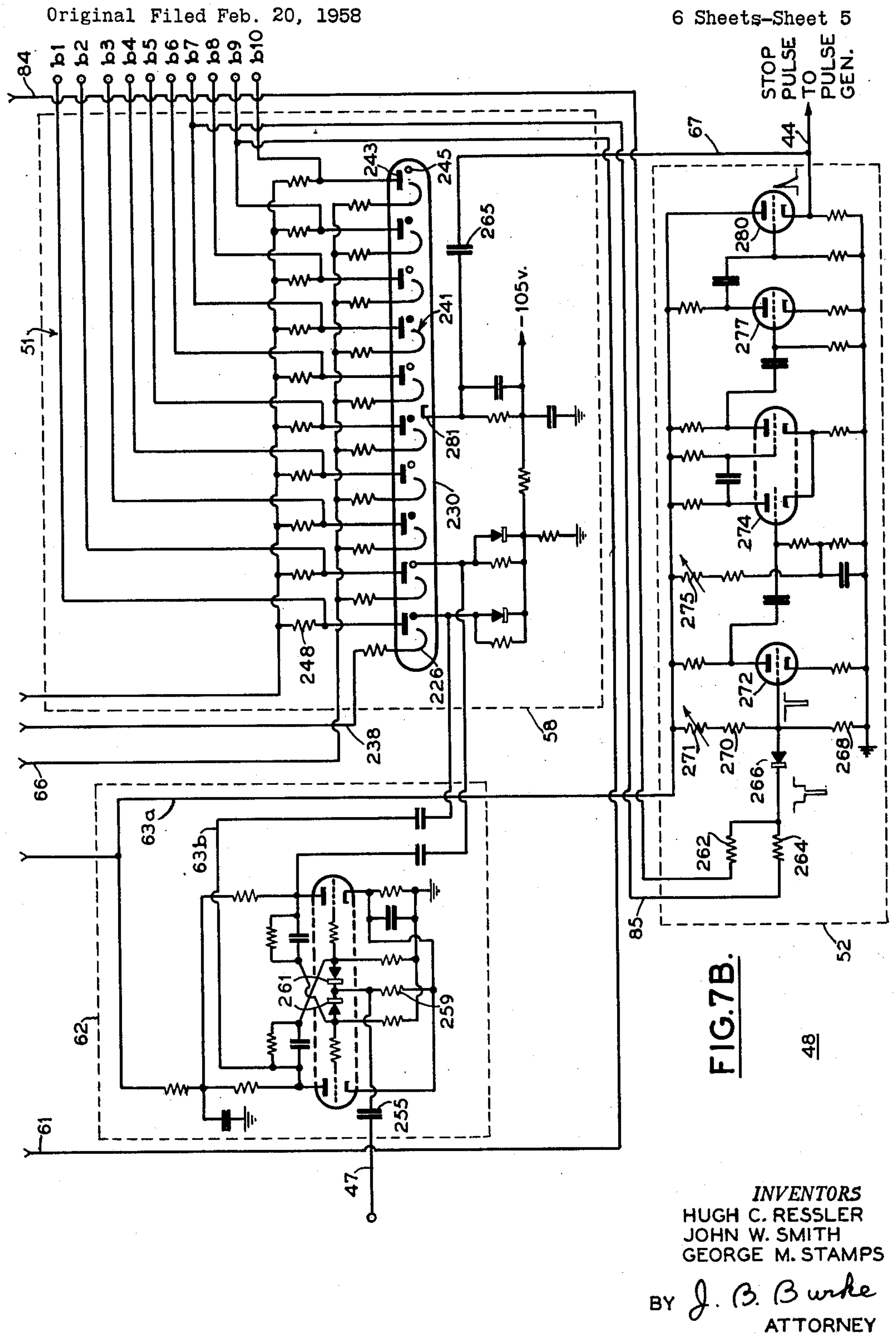

FIGS. 7A and 7B, taken together, show diagrammatically the arrangement of the sequential stepping circuit.

Figure 8:
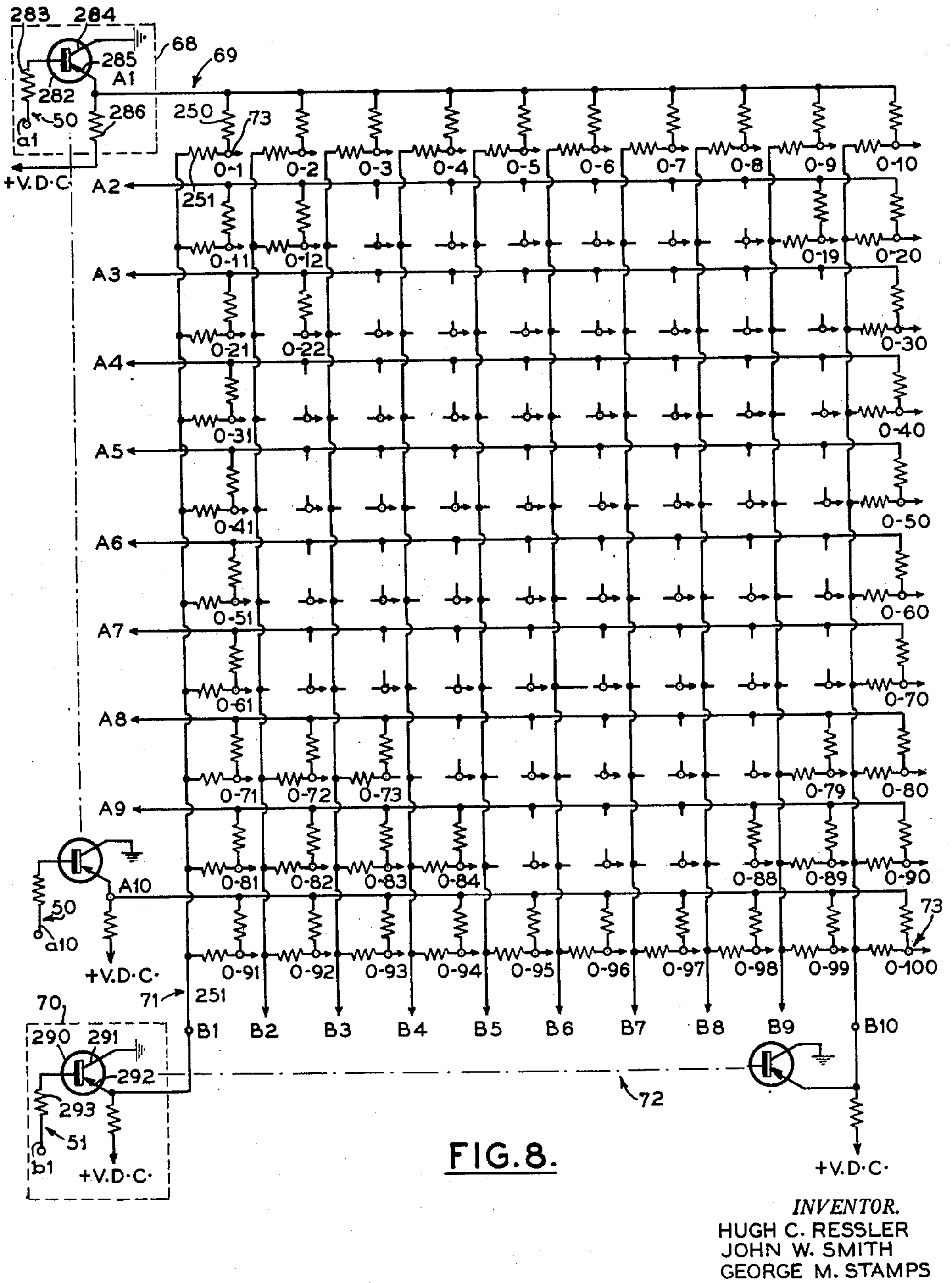

FIG. 8 is a diagram of the pulse distributing matrix with associated coupling circuits.

Figures 9, 10:
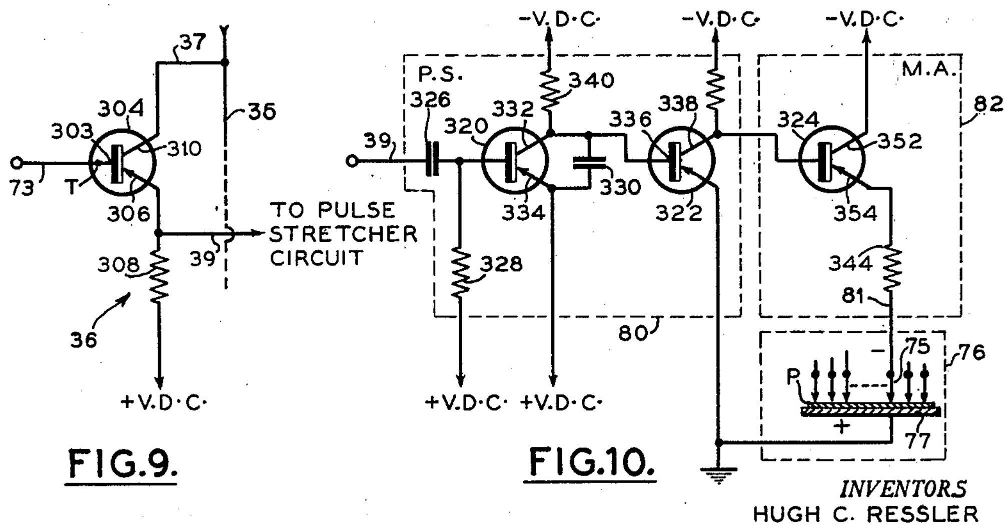

FIG. 9 is a diagram of a coincidence gate circuit.

FIG. 10 is a diagram of a pulse stretcher circuit and marking amplifier circuit.

Figure 1:
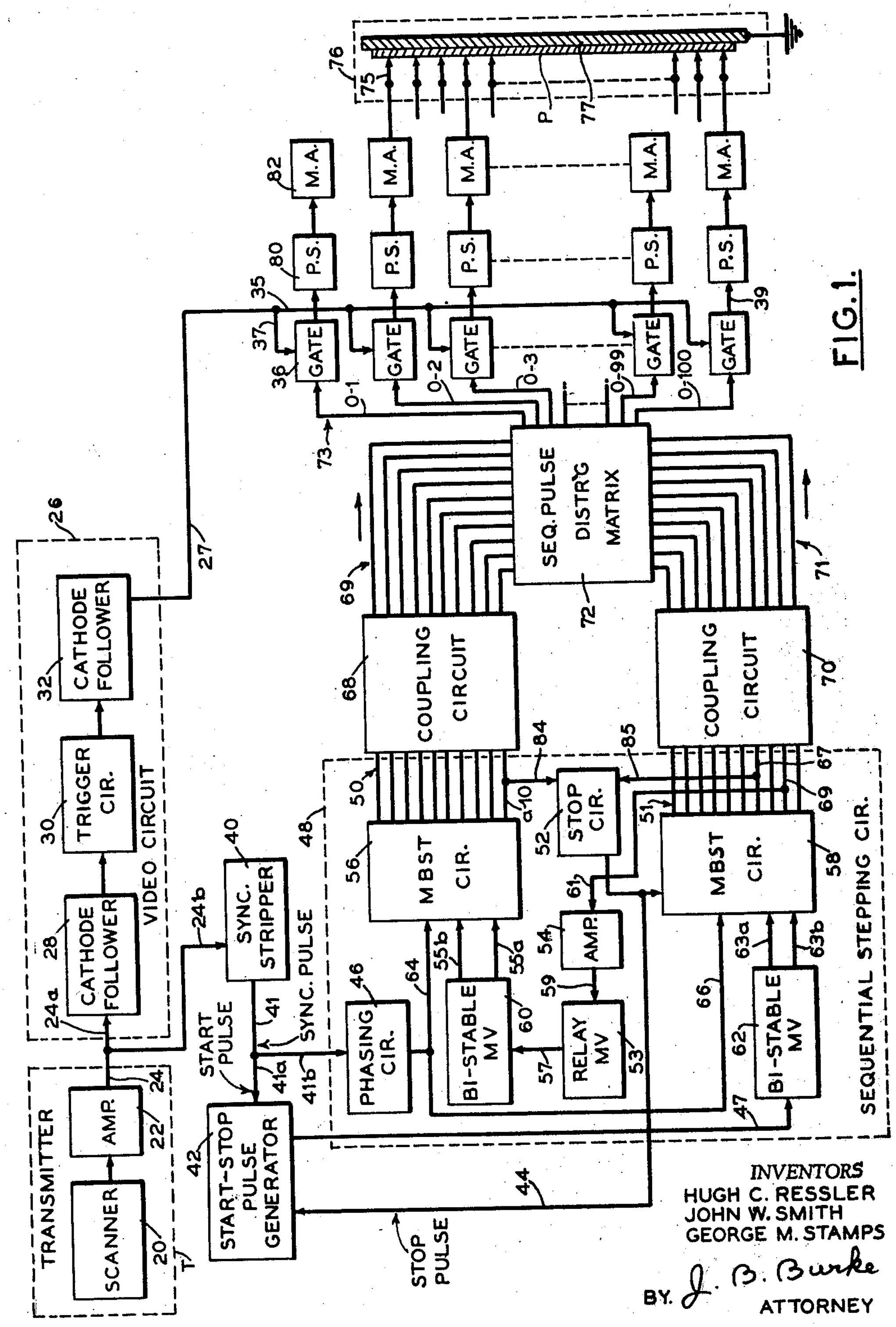
FIG. 1 is a block diagram of one form of system embodying the invention.

In FIG. 1 the transmitter station T is shown as including a scanner 20. This scanner provides composite video and synchronizing pulses from sequentially scanned copy. The output of the scanner is connected to a preamplifier 22 which raises the video signal amplitudes to a desired level, and feeds it via line 24 to the receiver station. Line 24 has two branches 24*a* and 24*b*. Amplifier 22 may be a conventional pentode amplifier terminated if desired in a cathode follower.

Line 24*a* terminates at video circuit 26. This circuit includes a cathode follower amplifier 28, trigger circuit 30 and cathode follower amplifier 32 connected in cascade. The cathode follower circuits 28 and 32 are used for signal isolation purposes. The trigger circuit 30 provides a quantized pulse output from all the signal inputs which have an amplitude greater than a preset level. The output of the video circuit is derived from cathode amplifier 32 which is connected via line 27 to all collectors in parallel of transistorized coincidence gate circuits 36. The video circuit 26 provides one signal or pulse for each gate via common line 35 and individual lines 37, the other two signals coming from the sequential pulse distributing matrix 72 via lines 73.

The video signal output of the transmitter is also delivered via line 24*b* to a synchronizing pulse stripper circuit 40. This circuit produces or separates synchronizing pulses from the video signal input to the receiver station. The synchronizing pulse output of circuit 40 is applied to a start-stop pulse generator 42 via lines 41, 41*a* to trigger this pulse generator. The pulse output of circuit 40 is also applied via lines 41 and 41*b* to phasing circuit 46 to provide suitable phasing pulses therefor. Phasing circuit 46 is part of the sequential stepping circuit 48 in the signal converter of the system. Pulse generator 42 receives start and stop pulses via lines 41*a* and 44 and delivers its output to a bi-stable multivibrator 62 via line 47.

Bi-stable multivibrators 60, 62 and all of the other multivibrators referred to herein may be Eccles-Jordan modifications of the Abraham and Bloch basic circuit, described in "Time Bases," by O. S. Puckle, Second Edition, John Wiley & Sons, 1951, pages 28, 36 and 76–80.

The sequential stepping circuit 48 provides two sets of ten repetitive outputs on lines 50 and 51. At any instant only one of the ten outputs 51 produces a pulse. This pulse appears sequentially at each of the ten outputs 51. The ten outputs 51 step at a cylical rate N which is ten times the rate $n$ of outputs 50, i.e. $N=10\times n$. Thus during each of the longer pulse steps produced in outputs 50 at the slower rate there are ten shorter sequential pulses produced at the faster rate at outputs 51. Consequentially, there will be a total of N or one hundred discrete sequential pulses produced at outputs 51 and $n$ or ten discrete sequential pulses produced at outputs 50 during each complete cycle by the sequential stepping circuit 48. A stop circuit 52 is connected to switching tube circuit 58 and pulse generator 46 to stop their action periodically. A delay multivibrator 53 and isolating amplifier 54 are connected between bistable multivibrator 60 and one of the outputs of switching tube circuit 56 to achieve exact synchronism of operation of the two switching tube circuits 56 and 58.

Magnetron beam switching tubes in circuits 56, 58 provide the two sets of ten output pulses at outputs 50, 51 respectively. Bi-stable multivibrators 60 and 62 drive the tubes in circuits 56, 58 respectively, to cause sequential stepping of their outputs. Phasing circuit 46 is connected to each of the tubes in circuits 56, 58 via lines 64, 66 to start the tubes in proper phase. The phasing circuit has a pulse output which is synchronized with the synchronizing pulses derived from the synchronizing pulse stripper circuit 40.

The ten outputs 50 are connected to ten transistors in coupling circuits 68 and the ten outputs 51 are connected to ten coupling circuits 70. The coupling circuits are connected to a sequential pulse distributing matrix 72 via lines 69 and 71. The matrix has one hundred outputs 73 respectively connected to individual gate circuits 36. The outputs of the gate circuits are respectively connected via lines 39 to pulse stretching circuits 80 and in turn to marking amplifiers 82. The pairs of circuits 80, 82 operate with negative input pulses of small amplitude and short time duration to provide high outputs negative pulses of extended time duration sufficient to produce simultaneous parallel marking of all styli 75 in the styli array at the recorder 76.

Figures 2, 3:
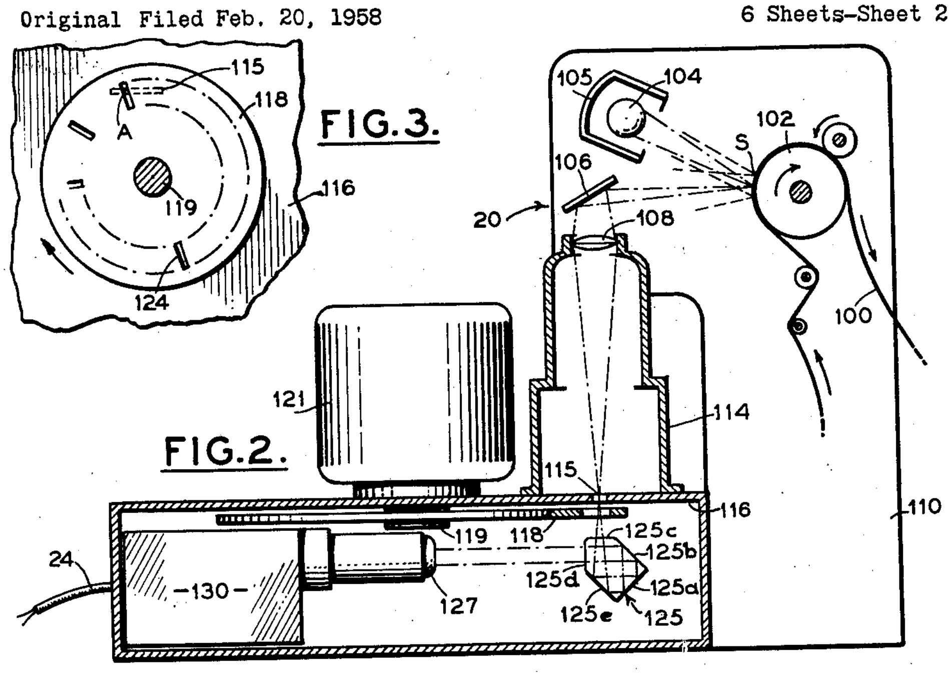
FIG. 2 is an elevational sectional view of a scanner device, usable in the present system.
FIG. 3 is a bottom view of the disk 118 shown in sectional view in FIGURE 2.

In FIGS. 2 and 3 are shown the arrangement of components of a scanner 20 which may be used for scanning graphic copy to produce sequential pulses employed as the data read-in pulses in the present system. A copy web 100 in the form of a sheet or tape bearing graphic subject matter to be scanned is carried on a rapidly rotating paper drive roller 102. A lamp 104 illuminates a narrow area of the copy as it passes over the roller. The lamp is carried in a reflector 105. Frame 110 supports the roller and lamp reflector. A line S of predetermined width on the copy 100 is scanned. Angularly disposed mirror 106 directs the reflected light rays into lens 108. Lens 108 is carried in a barrel on a support 114. Lens 108 focuses the scanned copy or data line S at slit 115 in horizontal plate 116. The slit extends in a tangential or chordal direction with respect to a flat circular disk 118 as clearly shown in FIG. 3. This disk is rotatably mounted on a shaft 119 parallel to plate 116 and is driven by a motor 121 mounted on plate 116. The disk has a plurality of radial slots 124 spaced circumferentially around the disk. As each of the slots 124 moves past the slit 115 in succession the apertures A defined by the intersection of the slot and slit transverses the image of the scanned line S on the slit, so that this image is scanned from end to end. The scanning of the image of line S is repeated with the passage of each slot 124 past the slit 115. The light passing through apertures A is passed to and through a light collector lens 125. This lens has five sides 125*a*, 125*b*, 125*c*, 125*d* and 125*e*. The light enters through sides 125*c* and is internally reflected from sides 125*e* and 125*a*, 125*b* in turn. The light leaves through sides 124*d* and passes directly to the photoelectric tube 127. This tube is connected to amplifier 22 (see FIG. 1) contained in compartment 130. The varying light applied to the photoelectric tube is converted into correspondingly varying video electrical pulses. The photoelectric tube may be a photomultiplier type similar to that shown in Patent 2,582,813 to F. A. Hester.

The video signal pulses appear at the output of amplifier 22. Each signal represents one complete scan of the data line S. If the disk 118 contains twenty-seven slots and the disk is rotated at sixty revolutions per second, the moving copy 100 will be scanned at the rate of 1620 scans per second. If the copy is scanned one hundred times for each inch of linear travel past the scanned line S, then the copy will be scanned at the rate of 16.2 inches per second. It will be apparent that it is possible to rotate the disk 118 at a faster or slower rate and the copy 100 can correspondingly be advanced at greater or lesser speed, so that the scanning speed depends actually upon the speed of rotation of the disk, the number of slots 124 in the disk, and the rate of speed of copy advance. The sequentially produced video signal pulses are applied to the video circuit 26 via line 24.

Just after each radial slot 124 has moved by the linear slit 115 there is a period of darkness until the next radial slot begins its scan. During this dark portion of the scanning cycle, a "blacker-than-black" pulse is generated by the photoelectric tube 127. Some light is always transmitted to the photoelectric tube 125 even from a black mark on copy sheet 100. When no light at all can reach the photoelectric tube as occurs during the successive period of darkness, only a minimum or residual current appears at the output of the photoelectric tube. This minimum or "dark" current is the blacker-than-black pulse. The blacker-than-black pulse occurs as a portion of every scanning cycle and is used for synchronizing purposes in the present system. The duration of the synchronizing pulses is determined by the ratio between the spacing between radial slots 124 on opaque disk 118 and the length of the linear slot 115. The synchronizing pulses are applied to the synchronizing pulse stripper circuit 40 (see FIG. 1).

Figure 4:
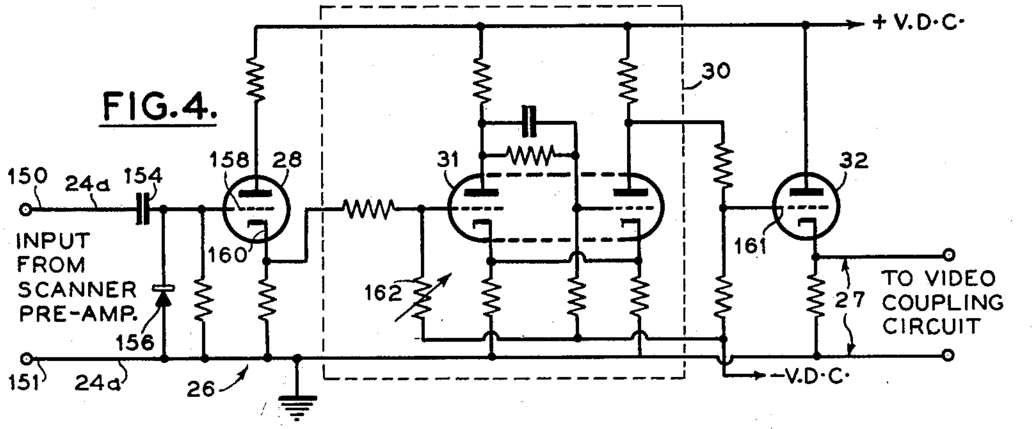
FIG. 4 is a diagram of the video signal circuit.

In FIG. 4 is shown a diagram of the video circuit 26. The input from the amplifier 22 is applied at terminals 150, 151. The cathode follower 28 is capacitively coupled to the input terminal by a coupling capacitor 154. The input D.-C. restored by a rectifier 156 to obtain a fixed voltage reference level for the signals which are applied to grid 158. The output of the cathode follower is taken from cathode 160 and applied to trigger tube 31 which may be a double triode in trigger circuit 30. A variable resistor 162 is used as a threshold control for setting the minimum level of signal which can actuate the trigger circuit 30. Any signal above this level causes the trigger circuit to operate to produce a flat-top fixed amplitude pulse output. The video output of tube 31 will thus be quantized; that is, there will be only two output conditions: on or off. For no signal input or a signal input less than the pre-set threshold, there will be no signal output. For any signal input of any amplitude above the pre-set threshold, there will be a fixed amplitude pulse output. Cathode follower 32 is connected to the output of the amplifier half of trigger tube 31. This cathode follower is biased to a conducting condition in the absence of an output from the trigger tube. A signal output applied at grid 161 will cut off the cathode follower. Therefore, the two output conditions will be a fixed positive potential representing no signal and a negatively going full excursion to ground representing a signal. The negatively going signal is applied to the video coupling circuit via line 27, and is sent on to the parallel-connected collectors of the gate circuits 36.

Figure 5:
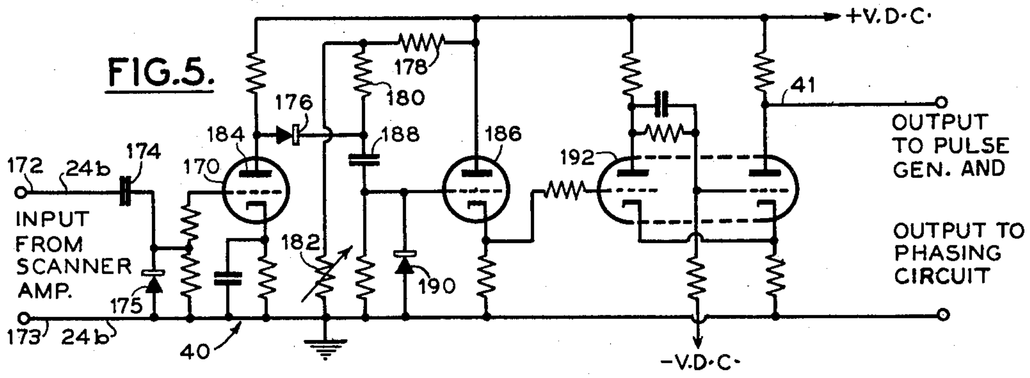
FIG. 5 is a diagram of the synchronizing pulse stripper circuit.

In FIG. 5 is shown the synchronizing pulse stripper circuit 40. The circuit includes an amplifier 170 coupled to the input terminals 172, 173 via a coupling capacitor 174 and a D.-C. restoring rectifier 175. A diode 176 in conjunction with fixed resistors 178, 180, and variable resistor 182 extract the most positive portion of the amplified signal at the plate 184. These resistors adjust the D.-C. potential on the cathode side of the diode so only the top portion of the positive signal can be sent through.

Amplifier 186 is coupled to amplifier 170 via coupling capacitor 186 and D.C. restoring rectifier 190. The output of amplifier 190 which is here used as a cathode follower is applied to a trigger tube 192 which may be a double triode similar to trigger tube 30 in FIG. 4. The amplified output of tube 192 is a quantized synchronizing pulse equal in phase and width (or time duration) to the original synchronizing pulse portion of the composite video and synchronizing pulse input derived from amplifier 22. The output of the trigger tube 192 is applied to pulse generator circuit 42 via line 41 and branch line 41*a*.

Figure 6:
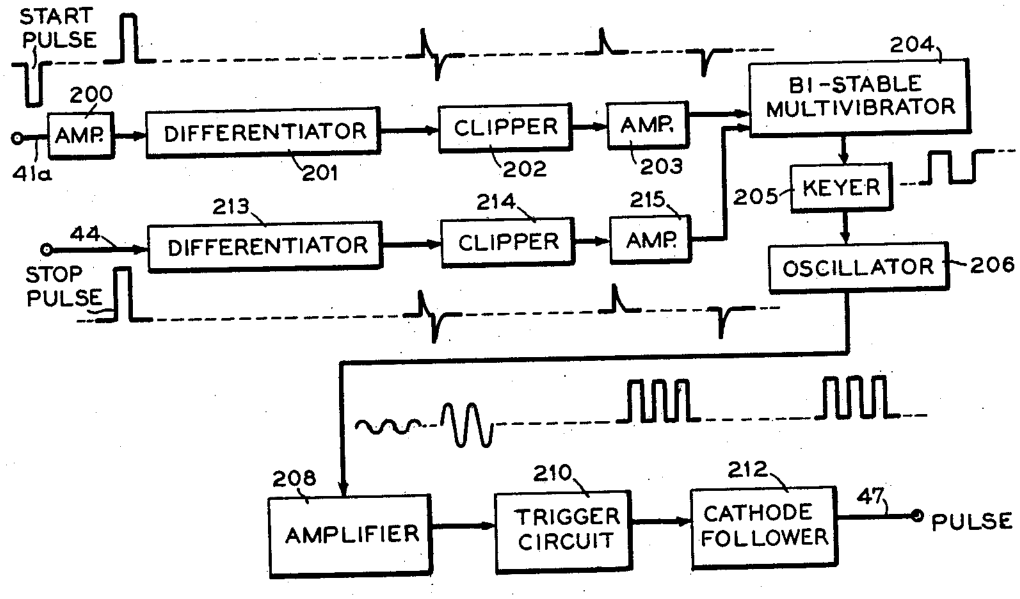
FIG. 6 is a block diagram of the start-stop pulse generator.

The start-stop pulse generator shown in blocking diagram form in FIGS. 1 and 6 is a controlled output unit with two inputs. One input provides the start pulses applied from the synchronizing stripper circuit 40 which pulses are effective in turning the output of the pulse generator on at output line 47. The stop pulses derived from stop circuit 52 serve to shut the output off at line 47. This action gives the receiving system the capability of working in exact synchronism with the mechanical scanning system at the transmitter.

Referring now to FIG. 6, amplifier 200 is shown connected via differentiator 201, pulse clipper 202 and amplifier 203 to a conventional bi-stable multivibrator 204 having two conducting conditions. Start pulses are applied on line 41*a* from synchronizing stripper circuit 40. The pulses are inverted in amplifier 200, differentiated by differentiator 201, annd negative spikes clipped by clipper 202 to provide amplified negative spike pulses for triggering the bi-stable multivibrator 204. The multivibrator sets the keyer 205 to its proper state for actuating oscillator 206. Keyer 205 may be a conventional on-off keyer tube which can be biased to conduct or cut off. Oscillator 206 may be a conventional sine wave oscillator with the usual parallel resonant tank circuit. The oscillator is actuated into either an on or an off output condition by the appropriate action of the keyer. Amplifier 208 increases the level of the oscillator output and also acts to isolate the oscillator circuitry from the trigger circuit 210. Circuit 210 may be a Schmitt type trigger circuit similar to trigger circuit 30 shown in FIG. 4. This is relaxation type circuit which produces an output of constant peak value, i.e., flat topped pulses which are obtained for the period that the input applied exceeds a specified voltage. Trigger circuit 210 employs cathode follower 212 as an output stage to isolate the trigger circuit from bi-stable multivibrator 62 to which the pulse generator output is delivered via line 47. Positive stop pulses are applied from stop circuit 52 and switching circuit 58 via line 44 to the differentiator 213. After the pulses are differentiated their negative spikes are clipped in a clipper circuit 214 which may be a conventional diode. After clipping the pulses are inverted in amplifier 203 and then applied to multivibrator 204 to trigger it. The successive transformation of the pulses is shown schematically in FIG. 6.

Bi-stable multivibrator 204 turns the keyer circuit 205 on and off. The amplified negative start pulses cause one conducting condition of the multivibrator to produce a burst output which biases the keyer 205 to cut-off and the oscillator 206 operates to produce a sine wave oscillation output. The amplified negative stop pulses cause a second conducting condition of the multivibrator which halts the burst output so that keyer 205 conducts to damp out the oscillator and shut off the oscillation output. As long as the keyer 205 is cut off, the oscillator will continue to have an output. When the keyer is on, its normally low impedance is shunted across the tank circuit of the oscillator to damp out the oscillator output. When a start pulse is applied to multivibrator 204 it biases the keyer 205 to cut-off, and oscillator 206 passes substantially sine wave oscillations to the isolating amplifier 208. The amplified oscillations are then applied to trigger circuit 210 which has a set input triggering level. This circuit produces square or flat-topped pulses from the sine wave input as long as input pulses of the required amplitude are applied. The flat-topped pulses are passed through the isolating cathode follower 212 to line 47 for delivery to multivibrator 62. The synchronizing pulses used as the start pulses may have any suitable time duration depending on the arrangement of scanner 20. The output from the pulse generator 42 will in any event be a series of shorter square wave pulses. These short pulses will be sent to the sequential stepping circuit 48 where they are used as the timing means to provide for the two sequential stepped outputs produced thereat. At the end of a predetermined number N of the short pulses the sequential stepping circuit 48 develops a stop pulse which stops the generating action of the pulse generator as above explained. This predetermined number N of short pulses is designated the "burst output." For example the burst output may consist of one hundred pulses which would correspond to the duration of the scanning lines, and a time period equivalent to a small number of additional pulses would be used after the burst output for blanking purposes to clear the system.

Referring now to FIGS. 7A and 7B taken together there is shown the schematic arrangement of the sequential stepping circuit 48. In this circuit phasing circuit 46 is a blocking type oscillator including tube 232. At the input of the tube is a differentiator consisting of resistor 233 and capacitor 234. A diode rectifier 235 is connected across resistor 233. The output of the phasing circuit is connected by wire 238 to the first spade 224 and 226 of each of the magnetron beam switching tubes 228 and 230. Each of tubes 228, 230 has a plurality of pairs of spades 340, 341 and targets 242, 243 with associated grids 244, 245 defining the positions to which the electron beam may be defined in turn. By changing the voltage of the grid associated with any spade from which the electron beam is to be deflected, it is possible to switch the beam in succession to each of the targets. The spades are disposed in a circular array so that the beam can be continuously switched in rotation from target to target. When the potential of all the spades is positive, the tube is in a cutoff or clear condition with no beam formed to any spade position. The beam may be formed in any of its "on" positions by sufficiently lowering the potential of the respective spade. When a beam has been formed on a target by a spade it can remain there indefinitely or it can be advanced by lowering the switching grid voltage. A voltage drop on the switching grid will disturb the electric field so that the beam is deflected to the next or leading target. The grids 244 and 245 are internally connected together in two groups of five each with alternately disposed grids connected together. Thus all the dark circled grids are to be regarded as connected together in one group and all the light circled grids are to be regarded as connected together in the other group. This grouping of the grids makes it possible to us a D.-C. pulsed input and still secure single position stepping. The outputs of the tubes are taken from resistors 246 and 248 which are connected to the targets 242, 243 of the respective tube.

There are ten output lines 50 numbered $a1$–$a10$ provided for each of the beam switching positions of tube 228 and ten output lines 51 numbered $b1$–$b10$ for each of the beam switchinng positions of tube 230.

The two groups of grids 244 of tube 228 are connected to the respective outputs of the double triode 252 in the bi-stable multivibrator 60 by lines 55*a* and 55*b*. This multivibrator has two alternate conductive states to which it is switched by pulses applied via line 57 from the output of delay circuit 53. Delay circuit 53 is actually a single pulse multivibrator. The time of emission of the successive puses can be varied with respect to the input by means of variable resistor 253. The input to multivibrator 60 is obtained from the output of amplifier 54, taken via wire 59. The pulse input to the amplifier is obtained via line 61 from the ninth output $b9$ of circuit 58.

Bi-stable multivibrator 62 is similar in structure to multivibrator 60. It also has two conductive states for alternately pulsing the two groups of grids 245 of tune 230 via lines 63*a* and 63*b*. Both of these multivibrators have differentiator circuits including capacitors 254, 255 and resistors 258, 259. Diodes 260 and 261 clip off the positive portions of differentiated pulses applied to the multivibrators. The pulses applied to multivibrator circuit 62 are obtained via line 47 from the pulse generator 42.

Stop circuit 52 is provided for furnishing stop pulses to the start-stop pulse generator via line 44. This circuit includes a double adder device consisting of resistors 262 and 264. Diode 266 and resistors 268, 270, 271 are connected to the adder circuit for biasing amplifier tube 272 and for clipping the added coincident pulses applied thereto. Double triode 274 is used as a one-shot trigger delay circuit provided with an adjustable delay control resistor 275. The output of the trigger circuit is applied to amplifier 277 for amplification and inversion of pulses. The output of the amplifier 277 is connected to the cathode follower 280. The output of the cathode follower is applied to pulse generator for shutting off the output. It is also applied to the cathode 281 of tube 230 via line 67 and coupling capacitor 26 to stop the magnetron beam switching action at the end of each burst of one hundred pulses.

The sequential stepping circuit 48 described above provides two sets of sequential pulse outputs in addition to the stop pulse for shutting off the output of the start-stop generator 42. In operation of circuit 48, a synchronizing pulse is applied to the phasing circuit 46 via line 41*b* for triggering this circuit. The phasing circuit renders the spades of both tubes 228 and 230 positive to clear them and sets them for the start of a stepping cycle at the first spades 224 and 226 of the respective tubes. The same synchronizing pulse serves as the start pulse to turn on the output of pulse generator 42. This pulse generator supplies the burst of N short pulses to the bi-stable multivibrator 62 via line 47. This multivibrator drives the beam switching tube circuit 58 and causes it to step at its ten outputs 51 in turn. During a complete stepping cycle each of the ten outputs 51 steps ten times so that there are one hundred (or N) pulses sequentially produced at outputs 51. It is desired that the outputs 50 of circuit 56 produce $n=N/10$ pulses or step sequentially ten times for each group of one hundred steps of outputs 51; that is, each of outputs 50 should step once for each group of ten steps sequentially performed at outputs 51. To accomplish this pulse division one of the outputs 51 ($b9$) is connected via line 61 to isolating amplifier 54. The pulses taken off this line are passed through amplifier tube 267 to delay multivibrator 53. Line $b9$ has ten short pulses appearing on it during each stepping cycle. These pulses actuate the bi-stable multivibrator 60 so that the beam switching tube circuit 56 produces ten sequential pulses at outputs 50. Each of these output pulses appears and remains on one of lines 50 for a time duration equal to ten sequentially stepped pulses on lines 51. The actuation of circuit 56 could be accomplished by taking initiating pulses off of any one of outputs 51 but the ninth output $b9$ is selected to achieve exact synchronism between the two circuits 56 and 58 so that they begin and end stepping simultaneously during each stepping cycle. Since some inherent delay may occur between the start of stepping of the respective circuits 56 and 58, the ninth output $b9$ is selected to allow sufficient additional time before the end of one cycle to condition multivibrator 60 for triggering circuit 56 and starting the next cycle of pulses. The delay circuit 53 delays the pulses of output $b9$ just long enough to permit the circuit 56 to be properly phased before multivibrator 60 is actuated to trigger circuit 56.

At the end of exactly N pulses (or one hundred pulses since this is a one hundred pulse stepping operation) the pulse generator output is turned off. To accomplish this, outputs $a10$ and $b7$ are connected via lines 84, 85 to stop circuit 52. The coincidence of pulses on these two lines occurs at the ninety-seventh pulse of the one hundred pulses of the stepping cycle. The coincident pulses when added by resistors 262, 264 together affect the bias of tube 272 sufficiently to actuate the stop circuit. The time duration of the $a10$ pulse is ten times that of the $b7$ pulse. When these pulses are added, a negative going spike on a negative pulse pedestal is obtained. Since only the negative spike is desired for triggering the stop circuit, diode 266, and resistor 268, 270, 271 are for clipping the incoming pulse and to bias tube 272 properly so that only the negative spike is applied to tube 272. Amplifier 272 drives the single pulse trigger delay circuit including tube 274. The duration of delay of the transmitted pulses is controlled by adjusting resistor 275 in the bias circuit of tube 274. The pulse output of tube 274 is amplified and inverted by tube 277 and is then passed through cathode amplifier 280. The stop pulse produced at the output of the stop circuit 52 has positive polarity. It is applied to cathode 281 of tube 230 where it shuts off the output of the tube at the end of the stepping cycle.

The stop circuit could be actuated by the last or one hundredth pulse of stepping cycle but this would not provide for the possible inherent delay in the stop circuit 52 or in circuit 58. The stop circuit is thus actuated at an earlier pulse time in the stepping cycle and a predetermined delay is introduced at trigger circuit 274 so that the pulse generator 42 has its output stopped exactly at the end of one hundred pulses. The stop pulse obtained from tube 280 also serves to stop the pulse output of circuit 42 at the end of a stepping cycle.

The two sequential pulse outputs of circuits 56 and 58 are applied to pulse distributing matrix 72 via the coupling circuits 68 and the coupling circuits 70 first shown in FIG. 8. Each coupling circuit 68 includes a transistor 282. The base of the transistor is connected to one of output lines 50 via a resistor 283. The collector 284 is grounded and the emitter 285 is connected to an input line 69 of the matrix 72. The emitter is connected to a positive D.-C. voltage via resistor 286. An identical coupling circuit is connected to each of the ten input lines 69 numbered A1–A10. Coupling circuits 70 have a similar connection with transistors 290. Collectors 291 are grounded and emitters 292 are connected to lines 71 numbered B1–B10. Ten similar transistors are provided for each of the ten lines 71. One of lines 51 is connected to each of the transistors 290 via a resistor 293. Each transistor serves as a linear amplifier to couple the applied pulses to the appropriate inputs of the matrix 72.

The sequential pulse distributing matrix 72 shown in FIG. 8 may be a ten by ten input arrangement providing one hundred outputs. The ten input lines 69 connected from the coupling circuits 68 are respectively designated A1 through A10 and the ten inputs 71 connected from coupling circuits 70 are designated B1 through B10. Each one of inputs 69 is connected via individual resistors 250 to a different group of ten outputs 73. There are one hundred outputs 73 respectively designated 0–1 through 0–100 so that the ten inputs 69 are resistor connected to outputs 73 as follows:

| Input | Outputs |
| --- | --- |
| A1 | 0-1, 0-2, 0-3, * * * 0-10 |
| A2 | 0-11, 0-12, 0-13, * * * 0-20 |
| A3 | 0-21, 0-22, 0-23, * * * 0-30 |
| * | * * * * |
| * | * * * * |
| * | * * * * |
| A10 | 0-91, 0-92, 0-93, * * * 0-100 |

Each one of inputs 71 is cross-connected via a separate resistor 251 to a different group of ten outputs 73 as follows:

| Input | Outputs |
| --- | --- |
| B1 | 0-1, 0-11, 0-21, * * * 0-91 |
| B2 | 0-2, 0-12, 0-22, * * * 0-92 |
| B3 | 0-3, 0-13, 0-33, * * * 0-93 |
| * | * * * * |
| * | * * * * |
| * | * * * * |
| B10 | 0-10, 0-20, 0-30, * * * 0-100 |

The matrix 72 receives pulses at the ten inputs 69 in sequential order. Inputs 71 likewise receive pulses in sequential order. The time duration of the individual pulses received at inputs 69 is ten times that of the individual pulses at inputs 71. Thus there is a sequential set of one hundred pulses derived in turn at the one hundred outputs 73 from the twenty input lines 69 and 71. Each output pulse is the sum of two pulses applied through two resistors 250 and 251 joined to that output.

Outputs 73 are each connected to the base 303 of a transistor 304 in an individual gate circuit 36 shown schematically in FIG. 9. Emitter electrode 306 of the transistor is connected to output resistor 308 which is in circuit with a positive D.-C. bias voltage. The output of the transistor is taken off wire 39 which terminates at a pulse stretching circuit 80. Wire 37 provides a video input signal from line 35 to the collector electrode 310. By using proper biasing of the emitter electrode 306, pulses must be applied simultaneously by one of the inputs 69 and by one of the inputs 71 to an output 73 before there is sufficient voltage to overcome this bias. Each pair of resistors 250 and 251 in the matrix 72 thus serves as an adder circuit for conditioning the gate to open. Before the gate can be completely open a third signal must be applied simultaneously from the video circuit 26 at the collector electrode 310. When signals are applied via lines 69 and 71 simultaneously the bias at emitter 306 will be sufficient, when accompanied by a video signal applied at collector 310, to develop a proper output signal across resistor 308 for actuating the associated pulse stretching circuit 80. If only one or two of the three required signals are present a signal of insufficient output will appear across resistor 308 to actuate circuit 80. The transistor actually serves as a double coincidence gate element. But in order for the gate to function properly, a triple coincidence of signals in the adder circuit 250, 251 and transistor 304 is necessary. Thus each adder circuit in conjunction with its associated transistor circuit serves as a triple coincidence gate circuit.

In FIG. 10 is shown a pulse stretching circuit 80 and marking amplifier circuit 82 which may be used in the present system. The purpose of these circuits is to operate with a negative input pulse of short duration to provide an amplified negative pulse of sufficient extended time duration to maintain continuity of marking at each stylus 75 between scanning cycles so that the stretch of each pulse has a time duration approximately equal to the duration of one scanning cycle. One pair of circuits 80, 82 is associated with each marking stylus 75. The pulse stretcher circuit 80 includes two transistors 320, 322. Input line 39 which is connected from an associated gate circuit 36 is connected to the base of transistor 320 via a coupling capacitor 326. A bias is applied via resistor 328 from a positive D.-C. voltage source. The output of the transistor 320 is connected to the base of transistor 322. Capacitor 330 is connected across the emitter 334 and collector 332 of transistor 320. Marking amplifier 82 has a transistor 324 whose base is connected to the collector 338 of transistor 322.

In the absence of an adequate input signal on line 39, transistor 322 normally conducts while transistors 320 and 324 are cut off. Upon receipt of a sufficient negative input pulse through coupling capacitor 326, transistor 320 conducts for the time duration of this limited input pulse to discharge capacitor 330. The discharge of this capacitor causes a positive potential to appear at the base 336 of transistor 322, thereby cutting it off. The collector 338 which was formerly at ground potential now becomes negative, causing transistor 324 which is connected to the output of transistor 322, to conduct. Transistor 324 conducts until the positive potential on the base 336 is sufficiently reduced by the charging action of capacitor 330 through resistor 340 to cause transistor 322 to again conduct, thereby cutting off transistor 324. The charging time of the capacitor 330 therefore determines the stretched length of the short time of narrow width pulse applied at input 39.

Transistor 324 is used to provide a marking signal output. The several transistors 324 serve as switches to turn the marking current on and off for the respective styli in recorder 76. This marking current is applied via collector 352 to the transistor 324. Resistor 344 in the circuit of emitter 354 holds the current in the transistor 324 down to a safe level.

The styli electrodes 75 are disposed in a straight line across the electrically markable paper P which is drawn at high speed between the aligned styli and the grounded electrode 77 in the recorder 76. The styli during marking are maintained negative with respect to the electrode 77. As the paper is drawn between the electrodes marking pulses may be applied simultaneously to all styli via the respective marking amplifiers associated with each stylus. Marking thus takes place in parallel while video signal pulses are being supplied sequentially from the scanner 20.

While the system has been explained with respect to a system having a hundred marking electrodes or styli in parallel it will be readily apparent that the system can be enlarged or reduced to accommodate any desired number of recording elements. For each stylus there will be provided an individual gate circuit, pulse stretching circuit and marking amplifier. Any changes in the number of styli will be accompanied by a corresponding change in the number of pulses N allotted to each stepping cycle. If the tubes 228 and 230 in circuit 48 each contained some number $k$ beam positions other than ten, then the tube 228 would be triggered $N/k$ times for each cycle of N times that tube 230 was triggered, and each beam position of tube 228 would be triggered once for each $N/k$ times that tube 230 was triggered.

The paper P can be advanced at high speeds with paper velocity speeds up to 5000 or more inches of copy per minute being readily attainable with marking definition of high quality. This contrasts sharply with prior known direct marking systems where the maximum paper velocity during marking of equal quality has been limited to less than ten inches of copy per minute.

The marking paper P is preferably of the electrolytic type mentioned but electrical marking paper of non-electrolytic type can be used at lower marking speeds.

This application is a continuation of application Serial No. 716,357, filed February 20, 1958, and now abandoned.

We claim:

1. A communication system comprising means for generating successive electric signals each of a predetermined duration and each having a generally non-sinusoidal waveform, the amplitude of each electric signal varying during the duration thereof thereby representing transmitted information, means for producing a synchronizing pulse between each electric signal, a plurality of coincidence gate circuits, means for applying one of said electric signals at a time to a plurality of said gate circuits simultaneously, a pulse generator, means for applying each synchronizing pulse to said pulse generator to produce a group of successive timing pulses, each group of timing pulses occurring simultaneously with the electric signal following its accompanying synchronizing pulse, means for applying the successive timing pulses of a group thereof to the gate circuits in sequence while at least a portion of said electric signal is applied thereto to produce a succession of output pulses at the respective gate circuits, a plurality of pulse stretching circuits, means for applying said gate output pulses to the respective pulse stretching circuits to produce a group of recording pulses, the duration of each recording pulse not exceeding the duration of the electric signal and its synchronizing pulse, the respective recording pulses having substantially equal time durations and having amplitudes corresponding to successive portions of said electric signal, a parallel bit recording device, and means for applying said group of recording pulses simultaneously to said device to record practically instantaneously a display of the transmitted information.

2. A communication system comprising means for generating successive electric signals each of a predetermined duration and each having a generally non-sinusoidal waveform, the amplitude of each electric signal varying during the duration thereof thereby representing transmitted information, said generating means producing a synchronizing pulse between each two successive electric signals, a plurality of coincidence gate circuits, means for applying one of said electric signals at a time to a plurality of said gate circuits simultaneously, a pulse generator, means for applying one synchronizing pulse at a time to said pulse generator to produce groups of timing pulses, each group of timing pulses occurring simultaneously with the electric signal following said one synchronizing pulse, pulse distributing means for applying the timing pulses of each group thereof to the gate circuits in sequence while at least a portion of said electric signal is applied thereto to produce a succession of output pulses at the respective gate circuits, a plurality of pulse stretching circuits, means for applying said output pulses to the respective pulse stretching circuits to produce thereat a group of recording pulses, the duration of each recording pulse not exceeding the duration of the electric signal and its synchronizing pulse, the respective recording pulses having substantially equal time durations and having amplitudes corresponding to successive portions of the electric signal, a parallel bit recording device including a recording medium moving in one direction, and means applying said group of recording pulses in parallel sequence to said device to produce practically instantaneously on said recording medium a recorded display of the entire scanned line, the successive scanned lines of said graphic copy being reproduced on said recording medium as parallel lines extending in the direction of movement of the recording medium.

3. A communication system comprising means for generating successive electric signals each of a predetermined duration and each having a generally non-sinusoidal waveform, the amplitude of each electric signal varying during the duration thereof thereby representing transmitted information with a synchronizing pulse occurring between each two successive electric signals, a plurality of coincidence gate circuits, means for applying one of said electric signals at a time to a plurality of the gate circuits simultaneously, a pulse stripper circuit for separating the synchronizing pulses, a pulse generator, means for applying the separated synchronizing pulses one at a time to said pulse generator, said generator being triggered to produce a series of timing pulses upon receipt of each synchronizing pulse, means for applying one of said timing pulses to said generator to stop generation of said series of timing pulses until a succeeding synchronizing pulse is applied thereto, means for applying said timing pulses to the gate circuits in sequence simultaneously with application of at least a portion of the electric signal thereto to produce a succession of output pulses thereat, a plurality of pulse stretching circuits, means for applying the output pulses to the pulse stretching circuits in turn to produce thereat a group of recording pulses, the duration of each recording pulse not exceeding the duration of the electric signal and its synchronizing pulse, the respective recording pulses having substantially equal time durations and having amplitudes corresponding to successive portions of the electric signal, a parallel bit recording device including a recording medium and a plurality of stationary styli disposed in a linear array transversely across said recording medium, and means for applying said group of recording pulses in parallel sequence to said styli to produce practically instantaneously on said medium a recorded display in the form of a transverse line of spaced dots representative of the transmitted information.

4. A communication system comprising means for generating successive electric signals each of a predetermined duration and each having a generally non-sinusoidal waveform, the amplitude of each electric signal varying during the duration thereof thereby representing transmitted information with a synchronizing pulse occurring between each two successive electric signals, a plurality of coincidence gate circuits, means for applying one of said electric signals at a time to a plurality of the gate circuits simultaneously, a pulse stripper circuit for separating the synchronizing pulses, a pulse generator, means for applying the separated synchronizing pulses one at a time to said pulse generator, means for triggering said generator to produce a series of timing pulses upon receipt of each synchronizing pulse, means for applying one of said timing pulses to said generator to stop generation of said series of timing pulses until a succeeding synchronizing pulse is applied thereto, means for applying successive timing pulses of said series to the gate circuits in succession simultaneously with application of at least a portion of the electric signal thereto to produce a succession of output pulses thereat, a plurality of pulse stretching circuits, means for applying the output pulses to the pulse stretching circuits in turn to produce thereat a group of recording pulses, the duration of each recording pulse not exceeding the duration of the electric signal and its synchronizing pulse, the respective recording pulses having substantially equal time durations and having amplitudes corresponding to successive portions of the electric signal, means for amplifying the respective recording pulses, a parallel bit recording device including a recording medium moving in one direction continuously and a plurality of stationary styli disposed in a linear array transversely across said recording medium, and means for applying one group of amplified recording pulses at a time to the styli to produce on said recording medium a recorded display consisting of a plurality of parallel lines extending in the direction of movement of the recording medium and representing the entire series of electric signals, with each one of the electric signals being represented by a single transverse linear array of elemental lengths of said parallel line.

5. A communications system, comprising an electro-optical scanner for scanning successive lines of a graphic copy medium advancing continuously in one direction with said lines disposed transversely to said direction, said scanner producing a series of video pulses of varying amplitude with a synchronizing pulse occurring between each two successive video pulses, each of the video pulses representing one entire scanned line of the copy and of predetermined duration, a plurality of coincidence gate circuits, means for applying one of said video pulses at a time to a plurality of the gate circuits simultaneously, a pulse stripper circuit for separating the synchronizing pulses, a pulse generator, means for applying the separated synchronizing pulses one at a time to said pulse generator, said generator being triggered to produce a series of timing pulses upon receipt of each synchronizing pulse, means for applying one of said timing pulses to said generator to stop generation of said series of timing pulses until a succeeding synchronizing pulse is applied thereto, means for applying successive timing pulses of said series to the gate circuits in succession simultaneously with application of at least a portion of a video pulse thereto to produce a succession of output pulses thereat, a plurality of pulse stretching circuits, means for applying the output pulses to the pulse stretching circuits to produce thereat a group of recording pulses, the duration of each recording pulse not exceeding the duration of a video pulse and its synchronizing pulse, the respective recording pulses having substantially equal time durations and having amplitudes corresponding to successive portions of a single video pulse, a parallel bit recording device including a recording medium moving in one direction continuously and a plurality of stationary styli disposed in a linear array transversely across said recording medium, and means for applying said group of recording pulses in parallel sequence to said styli to produce on said recording medium successive recorded lines of visible spaced dots representing the entire series of video pulses.

6. A communications system, comprising an electro-optical scanner for scanning successive lines of a graphic copy medium advancing in one direction with said lines disposed transversely to said direction, said scanner producing a series of video pulses of varying amplitude with a synchronizing pulse occurring between each two succesive video pulses, each of the video pulses representing one entire scanned line of the copy and of predetermined duration, a plurality of coincidence gate circuits, means for applying one of said video pulses at a time to a plurality of the gate circuits simultaneously, a pulse stripper circuit for separating the synchronizing pulses, a pulse generator, means for applying the separated synchronizing pulses one at a time to said pulse generator, said generator being triggered to produce a series of long timing pulses upon receipt of each synchronizing pulse, means for applying one of said timing pulses to said generator to stop generation of said series of timing pulses until a succeeding synchronizing pulse is applied thereto, another pulse generator, means for applying each series of timing pulses to the other pulse generator to generate groups of short timing pulses, means for applying the long and short timing pulses through respective adder circuits to the gate circuits simultaneously with application of at least a portion of a video pulse thereto to produce a succession of output pulses upon occurrence of triple coincidence of the pulses applied to the gate circuits, a plurality of pulse stretching circuits, means for applying the output pulses to the pulse stretching circuits to produce thereat a group of recording pulses having substantially equal time durations, the duration of each recording pulse not exceeding the duration of a video pulse and its synchronizing pulse, a plurality of marking amplifiers, means applying said recording pulses in parallel sequence to said marking amplifiers, a recording medium moving in one direction continuously, and a plurality of stationary styli connected to said amplifiers respectively, said styli being disposed in a linear array across the recording medium and receiving marking pulses from said amplifiers in parallel sequence to produce on said recording medium a plurality of parallel lines extending in the direction of movement of the recording medium and representing the graphic copy.

7. In a communications system a generator of video pulses representative of successive lines of scanned graphic copy and of predetermined duration with synchronizing pulses being interposed between the video pulses, a plurality of coincidence gate circuits, means for applying one of said video pulses at a time to a plurality of the gate circuits simultaneously, a pulse stripper circuit for separating the synchronizing pulses, a first pulse generator, means for applying the separated synchronizing pulses one at a time to said first pulse generator, said first generator being triggered to produce a series of first timing pulses upon receipt of each synchronizing pulse, means for applying one of said first timing pulses to said first generator to stop generation of said series of first timing pulses until a succeeding synchronizing pulse is applied thereto, a second pulse generator, means for applying one of each series of first timing pulses to said second pulse generator to generate groups of second timing pulses longer than said first timing pulses, a pulse distributing matrix for applying successive long and short timing pulses through respective adder circuits to the gate circuits simultaneously with application of at least a portion of a video pulse thereto to produce a succession of output pulses upon occurrence of triple coincidence of the pulses applied to the gate circuits, a plurality of pulses stretching circuits, means for applying the output pulses to the pulse stretching circuits to produce thereat a group of recording pulses having substantially equal time durations, the duration of each recording pulse not exceeding the duration of a video pulse and its synchronizing pulse, a plurality of marking amplifiers, means applying said recording pulses in parallel sequence to said marking amplifiers, a recording medium moving in a one direction continuously, and a plurality of stationary styli connected to said amplifiers respectively, said styli being disposed in a linear array across the recording medium and receiving marking pulses from said amplifiers in parallel sequence to produce on said recording medium a plurality of parallel lines extending in the direction of movement of the recording medium and representing the graphic copy.

8. A communication system comprising means for generating successive electric signals each of a predetermined duration and each having a generally non-sinusoidal waveform, the amplitude of each electric signal varying during the duration thereof thereby representing transmitted information with a synchronizing pulse occurring between each two successive electric signals, a plurality of coincidence gate circuits, means for applying one of said electric signals at a time to a plurality of the gate circuits simultaneously, a pulse stripper circuit for separating the synchronizing pulses, a first pulse generator, means for applying the separated synchronizing pulses one at a time to said first pulse generator, said first generator being triggered to produce a series of first timing pulses upon receipt of each synchronizing pulse, means for applying one of said first timing pulses to said first generator to stop generation of said series of first timing pulses until a succeeding synchronizing pulse is applied thereto, a second pulse generator, means for applying one of each series of first timing pulses to said second pulse generator to generate groups of second timing pulses longer than said first timing pulses, a pulse distributing matrix for applying the successive long and short timing pulses through adder circuits to the gate circuits simultaneously with said application of at least a portion of an electric signal thereto produce a succession of output pulses upon occurrence of triple coincidence of the pulses applied to the gate circuits, a plurality of pulse stretching circuits, means for applying the output pulses to the pulse stretching circuits to produce thereat a group of recording pulses having substantially equal time durations, the duration of each recording pulse not exceeding the duration of an electric signal and its synchronizing pulse, a plurality of marking amplifiers, means applying said recording pulses in parallel sequence to said marking amplifiers, a recording medium moving in one direction continuously, and a plurality of stationary styli connected to said amplifiers respectively, said styli being disposed in a linear array across the recording medium and receiving marking pulses from said amplifiers in parallel sequence to produce on said recording medium a plurality of parallel lines extending in the direction of movement of the recording medium and representing the series of electric signals, with each electric signal being represented by a single transverse linear array of elemental lengths of said parallel lines.

References Cited in the file of this patent

UNITED STATES PATENTS

| | | |
|---|---|---|
| 2,672,392 | Caples et al. | Mar. 16, 1954 |
| 2,698,875 | Greenwood | Jan. 4, 1955 |